United States Patent
Park et al.

(10) Patent No.: US 10,827,510 B2
(45) Date of Patent: *Nov. 3, 2020

(54) ELECTRONIC DEVICE AND WIRELESS NETWORK ACCESS METHOD IN ELECTRONIC DEVICE

(71) Applicant: Samsung Electronics Co., Ltd., Gyeonggi-do (KR)

(72) Inventors: Dong-Hoo Park, Seoul (KR); Sang-Hoon Cho, Gyeonggi-do (KR); Geon-Soo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,600

(22) Filed: Jun. 24, 2019

(65) Prior Publication Data

US 2019/0313421 A1    Oct. 10, 2019

Related U.S. Application Data

(63) Continuation of application No. 14/718,619, filed on May 21, 2015, now Pat. No. 10,334,607.

(30) Foreign Application Priority Data

May 29, 2014   (KR) .................... 10-2014-0064933

(51) Int. Cl.
*H04W 72/08*   (2009.01)
*H04W 8/20*    (2009.01)
(Continued)

(52) U.S. Cl.
CPC ........... *H04W 72/085* (2013.01); *H04L 63/18* (2013.01); *H04W 8/20* (2013.01);
(Continued)

(58) Field of Classification Search
CPC ............. H04W 84/12; H04W 72/0446; H04W 74/0833; H04W 4/005; H04W 76/023;
(Continued)

(56) References Cited

U.S. PATENT DOCUMENTS 7,689,700 B2   3/2010  McNeil et al.
8,353,052 B2   1/2013  Larsson et al.
(Continued)

FOREIGN PATENT DOCUMENTS

CN    101924786 A    12/2010
CN    103348373 A    10/2013
(Continued)

OTHER PUBLICATIONS

"Wi-Fi Simple Configuration Technical Specification"; 2011; Version 2.0.2; Wi-Fi Alliance; XP055050847.
European Search Report dated Aug. 6, 2020.

*Primary Examiner* — Michael J Moore, Jr.
(74) *Attorney, Agent, or Firm* — Cha & Reiter, LLC

(57) ABSTRACT

An electronic device and a wireless network access method in the electronic device. The wireless network access method includes obtaining at least one of wireless network access information associated with a wireless network that is capable of communicating with the electronic device and effectiveness information. The at least one of network access information and effectiveness information is transmitted information to an external device with respect to the electronic device such that the external device determines whether to access the wireless network or to release the access to the wireless network based on the received at least one information.

14 Claims, 6 Drawing Sheets

(51) Int. Cl.
*H04W 48/18* (2009.01)
*H04L 29/06* (2006.01)
*H04W 12/08* (2009.01)
*H04W 12/00* (2009.01)

(52) U.S. Cl.
CPC ....... *H04W 12/0023* (2019.01); *H04W 12/08* (2013.01); *H04W 48/18* (2013.01)

(58) Field of Classification Search
CPC ... H04W 4/008; H04W 72/042; H04W 8/005; H04W 48/16; H04W 48/18; H04W 72/0413; H04W 88/08; H04W 12/06; H04W 48/20
See application file for complete search history.

(56) References Cited

U.S. PATENT DOCUMENTS

| | | | |
|---|---|---|---|
| 8,510,808 B2 | 8/2013 | McNeil et al. | |
| 8,576,846 B2 | 11/2013 | Kumar et al. | |
| 8,776,177 B2 | 7/2014 | Ferren et al. | |
| 9,071,967 B1 | 6/2015 | Davies et al. | |
| 9,319,223 B2 | 4/2016 | Nix | |
| 9,344,485 B2 | 5/2016 | Smadi et al. | |
| 9,473,938 B2 | 10/2016 | Miao et al. | |
| 10,334,607 B2 * | 6/2019 | Park | H04W 8/20 |
| 2001/0032153 A1 | 10/2001 | Miller | |
| 2005/0114650 A1 | 5/2005 | Rockwood et al. | |
| 2006/0164208 A1 | 7/2006 | Schaffzin et al. | |
| 2008/0034081 A1 | 2/2008 | Marshall et al. | |
| 2008/0289006 A1 | 11/2008 | Hock et al. | |
| 2009/0119780 A1 | 5/2009 | Ham | |
| 2009/0222659 A1 | 9/2009 | Miyabayashi et al. | |
| 2009/0234878 A1 | 9/2009 | Herz et al. | |
| 2010/0124213 A1 | 5/2010 | Ise et al. | |
| 2010/0269157 A1 | 10/2010 | Experton | |
| 2010/0274859 A1 | 10/2010 | Bucuk | |
| 2010/0319052 A1 | 12/2010 | Ferren et al. | |
| 2011/0167444 A1 | 7/2011 | Sun et al. | |
| 2012/0166538 A1 | 6/2012 | Son et al. | |
| 2013/0024515 A1 | 1/2013 | Parker | |
| 2013/0034090 A1 | 2/2013 | Thomas et al. | |
| 2013/0036231 A1 | 2/2013 | Suumaki | |
| 2013/0107806 A1 | 5/2013 | Lee et al. | |
| 2013/0124617 A1 | 5/2013 | Lee et al. | |
| 2013/0185806 A1 | 7/2013 | Hatakeyama | |
| 2013/0191883 A1 | 7/2013 | Tung | |
| 2013/0318573 A1 * | 11/2013 | Reunamaki | H04W 12/04 726/4 |
| 2013/0337803 A1 | 12/2013 | Christopher et al. | |
| 2013/0347073 A1 | 12/2013 | Bryksa et al. | |
| 2014/0020071 A1 | 1/2014 | Jannelli et al. | |
| 2014/0035952 A1 | 2/2014 | Mikuni | |
| 2014/0068719 A1 * | 3/2014 | Kiukkonen | H04W 12/08 726/4 |
| 2014/0075523 A1 | 3/2014 | Tuomaala et al. | |
| 2014/0113549 A1 | 4/2014 | Beg et al. | |
| 2014/0206346 A1 | 7/2014 | Kiukkonen et al. | |
| 2015/0085848 A1 * | 3/2015 | Reunamaki | H04W 12/04 370/338 |
| 2015/0103770 A1 | 4/2015 | Chang et al. | |
| 2015/0119000 A1 | 4/2015 | Miao et al. | |
| 2015/0119060 A1 | 4/2015 | Aoyagi et al. | |
| 2015/0124791 A1 | 5/2015 | Mazandarany et al. | |
| 2015/0139210 A1 * | 5/2015 | Marin | H04W 48/16 370/338 |
| 2015/0172925 A1 * | 6/2015 | Leppanen | H04W 12/04 726/7 |
| 2016/0183180 A1 | 6/2016 | Garcia Martin et al. | |
| 2016/0234690 A1 | 8/2016 | Michalski et al. | |

FOREIGN PATENT DOCUMENTS

| | | |
|---|---|---|
| CN | 103441997 A | 12/2013 |
| CN | 103475754 A | 12/2013 |
| CN | 104106062 A | 10/2014 |
| EP | 2 624 616 A1 | 8/2013 |
| KR | 10-2013-0047300 A | 5/2013 |
| KR | 10-2013-0057617 A | 6/2013 |
| WO | 2012/129400 A2 | 9/2012 |
| WO | 2013/160526 A1 | 10/2013 |
| WO | 2014/036689 A1 | 3/2014 |

\* cited by examiner

ELECTRONIC DEVICE AND WIRELESS NETWORK ACCESS METHOD IN ELECTRONIC DEVICE

CLAIM OF PRIORITY

This application is a Continuation of U.S. patent application Ser. No. 14/718,619 filed on May 21, 2015 which claims the benefit of priority under 35 U.S.C. § 119(a) from Korean Patent Application Serial number 10-2014-0064933, which was filed on May 29, 2014 in the Korean Intellectual Property Office, the entire disclosure of which is hereby incorporated by reference in its entirety.

BACKGROUND

Field of the Disclosure

Various embodiments of the present disclosure relate to an electronic device and a wireless network access method in the electronic device in which wireless network access information is provided to obtain access to the wireless network.

Description of the Related Art

The development of electronic devices with wireless communication capability continues to advance, particularly in the area of portable and handheld electronic devices. The proliferation of such electronic devices has also spearheaded developments related to accessing a wireless network for a wireless network service.

The wireless network may include, for example, a Wireless Wide Area Network (WWAN) such as $3^{rd}$-Generation (3G), $4^{th}$-Generation (4G), or Long Term Evolution (LTE), a Wireless Local Area Network (WLAN) such as Wireless Fidelity (Wi-Fi), a Wireless Personal Area Network (WPAN) such as Bluetooth®, and the like. The electronic device may be conveniently provided with various services such as an Internet service, a communication service, and so forth, by using the wireless network. For example, the wireless network may be used wherever the user moves the portable device so long as they are within a communication range of the network. Such places that a wireless network would be used would include at home, in companies, or in public places where an electronic device is often used, and the electronic device may use the wireless network by accessing the wireless network at permitted locations.

The wireless network may be opened to use by any electronic device, but such use may be configured as being restricted to permitted electronic devices that are granted access by using wireless network access information such as a password.

The electronic device often receives wireless network access information as an input from a user of the electronic device in order to use the wireless network. For example, the user may select a network, then input wireless network access information that was previously setup with or received from the particular network.

Thus, the electronic device may easily receive the wireless network access information from the user if the user knows the wireless network access information that needs to be input, but if the user does not know the wireless network access information, the user has to be provided first with the wireless network access information from a wireless network access provider or another party knowing the wireless network access information. However, as there is no other way conventionally to access the wireless network than via reception of the wireless network access information manually input from the user, this drawback often causes a great deal of inconvenience.

For example, the wireless network access information is nonpublic information like a password and is often shared only by a limited number of users in order to maintain security with respect the limited users and to prevent unauthorized access. Nevertheless, heretofore there has not been a scheme proposed to share the wireless network access information in a manner for maintaining security other than the conventional entry of network access information.

The wireless network provider for providing the wireless network may limit users who use the wireless network with the wireless network access information, but no such method exists in the conventional art to control the use of the wireless network for each user other than conventional entry of network access information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure have been made to at least partially solve, alleviate, or remove at least one of the problems and/or disadvantages such as those described above.

Accordingly, various aspects of the present disclosure provide an electronic device capable of sharing wireless network access information while maintaining security and a wireless network access method in the electronic device that is heretofore unknown.

Other objects to be provided in the present disclosure will be better understood by various embodiments described below.

According to an aspect of the present disclosure, there is provided a wireless network access method in an electronic device, in which the method may include obtaining by the electronic device at least one of wireless network access information associated with a wireless network (the obtaining may be retrieved from a storage unit), in which the wireless network is capable of communicating with the electronic device and effectiveness information, and transmitting by the electronic device the at least one of wireless network access information and effectiveness information to an external device with respect to the electronic device such that the external device determines whether to access the wireless network or to release the access to the wireless network based on the transmitted at least one information.

The Effectiveness information may be identified at least one constraint associated with the wireless network access information. The Effectiveness information may be generated utilizing obtained user policy information.

According to another aspect of the present disclosure, there is provided an electronic device including a communication unit configured to access a wireless network, and a controller functionally coupled with the communication unit, in which the controller obtains at least one of wireless network access information associated with the wireless network, in which the wireless network is capable of communicating with the electronic device and effectiveness information, and the communication unit transmits the at least one of wireless network access information and effectiveness information to an external device with respect to the electronic device such that the external device accesses the wireless network or releases the access to the wireless network based on the at least one of wireless network access information and effectiveness information.

According to another aspect of the present disclosure, there is provided a wireless network access method in an electronic device, the method including receiving from an external device at least one of wireless network access information associated with a wireless network, in which the wireless network is capable of communicating with the electronic device and effectiveness information, and accessing the wireless network or releasing the access to the wireless network based on the received at least one information.

According to another aspect of the present disclosure, there is provided an electronic device including a communication unit configured to access a wireless network and a controller functionally coupled with the communication unit, in which the controller receives from an external device with respect to the electronic device at least one of wireless network access information associated with a wireless network, and in which the wireless network is capable of communicating with the electronic device and effectiveness information and accesses the wireless network or releases the access to the wireless network based on the at least one of wireless network access information and effectiveness information.

According to another aspect of the present disclosure, there is provided a non-transitory storage medium having a wireless network access program stored therein, in which the program executes in an electronic device, obtaining at least one of wireless network access information associated with a wireless network that is capable of communicating with the electronic device and effectiveness information and transmitting to an external device with respect to the electronic device the at least one of wireless information and effectiveness information such that the external device accesses the wireless network or releases the access to the wireless network based on the at least one of wireless network access information and effectiveness information.

According to another aspect of the present disclosure, there is provided a non-transitory storage medium having a wireless network access program stored therein, in which the program executes in an electronic device, receiving from an external device with respect to the electronic device at least one of wireless network access information associated with a wireless network that is capable of communicating with the electronic device and effectiveness information and accessing the wireless network or releasing the access to the wireless network based on the at least one of wireless network access information and effectiveness information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of embodiments of the present disclosure will become more apparent from the following description taken in conjunction with the accompanying drawings, in which.

Throughout the drawings, like reference numerals will be understood to refer to like parts, components, and structures.

DETAILED DESCRIPTION

Figure 1:
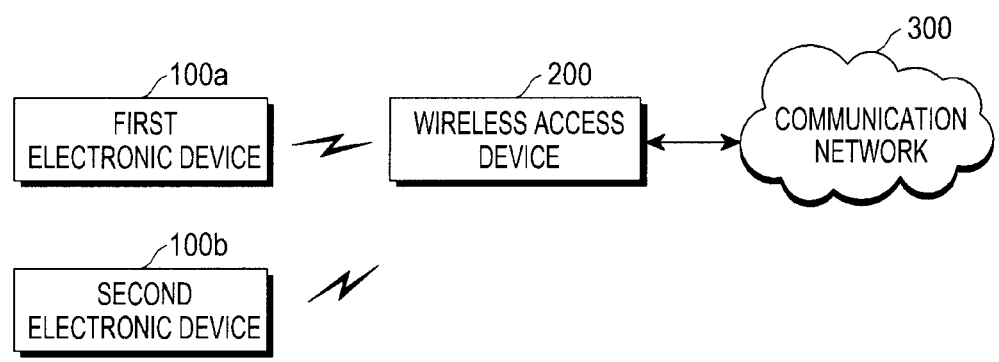
FIG. 1 is a schematic conceptual diagram for describing a wireless network access system according to an embodiment of the present disclosure.

The following description with reference to the accompanying drawings is provided to assist a person of ordinary skill in the art in a comprehensive understanding of various embodiments of the present disclosure as defined by the claims and their equivalents. The description includes various specific details to assist in that comprehensive understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness when their inclusion may obscure appreciation of the present disclosure with descriptions of well-known functions and constructions.

The terms and words used in the following description and claims are not limited to meanings found in materials such as books and trade publications, but are to be interpreted as would be understood by a person of ordinary skill in the art. Such terms and words herein are used by the inventor to enable a clear and consistent understanding of the present disclosure by persons of ordinary skill in the art. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the terms used in various embodiments of the present disclosure, general terms that are currently in wide use have been selected considering descriptions contained in various embodiments of the present disclosure, but such terms may change according to intentions of those of ordinary skill in the art or cases, or emergence of new technologies. In special cases, there may be terms that are selected arbitrarily by the applicant, and in these cases, meanings of such terms will be explained in detail in the detailed description of the various embodiments of the present disclosure. Therefore, the terms used in the various embodiments of the present disclosure may be defined based on the meanings of the terms and the overall contents of the various embodiments of the present disclosure as understood by the artisan, rather than simply based on names or book definitions of the terms.

However, to assist the artisan with a better understanding the of present disclosure and its appended claims, with regard to the terms "lifespan information" and "expiration information", an artisan is to appreciate that as both terms are used herein, lifespan information may include expiration information and an amount of data.

"Effectiveness information" may be identified at least one constraint associated with the wireless network access information, the user policy information may be obtained based on information input by the user of the electronic device or may be obtained according to a preset value, and The effectiveness information may be obtained utilizing obtained user policy information.

With regard to disclosure that the information about the wireless network access information storage possibility has a value of "FALSE", an artisan is to understand that the term "FALSE" may indicate that the wireless network access information cannot be stored.

When a part "includes" a component in various embodiments of the present disclosure, it means that the component may further include another component rather than excluding another component, unless the context clearly dictates otherwise. The terms "unit", "module", or the like used in various embodiments of the present disclosure mean a unit for processing at least one function or operation, and the implementation is statutory implementation such as by hardware, and such hardware may be configured for operation through the execution of machine readable code.

Hereinafter, various embodiments of the present disclosure will be described in detail with reference to details in the accompanying drawings. However, the present disclosure is not limited by the various embodiments. Throughout the drawings, identical reference numerals refer to members that perform substantially identical functions.

FIG. 1 is a schematic conceptual diagram that illustrates a wireless network access system according to an embodiment of the present disclosure.

Referring now to FIG. 1, for example, a wireless network access system may include a first electronic device 100a, a second electronic device 100b, a wireless access device 200, and a communication network 300.

According to an embodiment of the present disclosure, the wireless access device 200 allows the at least one electronic device to wirelessly access the communication network 300, and the communication between the first and second electronic devices 100a, 100b and the wireless access device 200 in FIG. 1 is wireless as well. For example, the wireless access device 200 may be an Access Point (AP) and may be connected with the communication network 300 such as an Internet network to allow the at least one electronic device to be connected to the communication network 300 between the at least one electronic device and the communication network 300. The wireless access device 200 requests wireless network access information to enable an electronic device responding with the wireless network access information to be connected to the communication network 300.

According to another embodiment of the present disclosure, the first electronic device 100a may be an electronic device having the wireless network access information that allows access to the communication network 300 through the wireless connection device 200, and may share the wireless network access information with the second electronic device 100b. For example, the first electronic device 100 a may obtain user policy information to generate wireless network sharing information including wireless network access information or effectiveness information, and provides the generated wireless network sharing information to the second electronic device 100b.

According to an embodiment of the present disclosure, the wireless network access information may be a code, such as a password, for accessing the communication network 300 through the wireless access device 200. The effectiveness may be identified at least one constraint associated with the wireless network access information. The effectiveness information may include at least one of information about: a storage possibility of wireless network access information storage, information about a period during which the second electronic device 100b may access the communication network 300 through the wireless access device 200, and information about the amount of data with which the second electronic device 100b may be provided by accessing the communication network 300 through the wireless access device 200.

According to an embodiment of the present disclosure, the second electronic device 100b receives wireless network sharing information from the first electronic device 100a and identifies wireless network access information or effectiveness information from the received wireless network sharing information. The second electronic device 100b accesses the communication network 300 through the wireless access device 200 based on the wireless network access information or the effectiveness information, thus being provided with a communication network service. For example, the second electronic device 100b may access the communication network 300 through the wireless access device 200 by using the wireless network access information. The second electronic device 100b deletes or stores the wireless network access information based on the effectiveness information. The second electronic device 100b controls access to the communication network 300 or releases the access based on the information about the period during which the second electronic device 100b may access the communication network 300 through the wireless access device 200 or the information about the amount of data with which the second electronic device 100b may be provided through the wireless access device 200.

According to an embodiment of the present disclosure, when one electronic device provides wireless network access information, the electronic device operates as the first electronic device 100a, and when another electronic device is provided with the wireless network access information from the first electronic device 100a, said another electronic device operates as the second electronic device 100b. According to another embodiment of the present disclosure, one electronic device may operate as the first electronic device 100a that provides the wireless network access information, and another electronic device may operate as the second electronic device 100b that is provided with the wireless network access information.

An electronic device according to various embodiments of the present disclosure may be a device that is capable on its own of accessing a wireless network. For example, the electronic device may include at least one of a smart phone, a tablet Personal Computer (PC), a mobile phone, a video phone, an electronic (e-)book reader, a desktop PC, a laptop PC, a netbook computer, a Personal Digital Assistant (PDA), a Portable Multimedia Player (PMP), an MP3 player, mobile medical equipment, a camera, a wearable device (for example, a Head-Mounted Device (HMD) such as electronic glasses), an electronic cloth, an electronic bracelet, an electronic necklace, an electronic "appcessory", an electronic tattoo, and a smart watch, just to name a few non-limiting possibilities.

According to some embodiments, the electronic device may be a smart home appliance. The smart home appliance may include, for example, a Television (TV), a Digital Video Disk (DVD) player, audio equipment, a refrigerator, an air conditioner, a vacuum cleaner, an oven, a microwave oven, a laundry machine, an air cleaner, a set-top box, a TV box (for example, HomeSync™ of Samsung, TV™ of Apple, or TV™ of Google, a game console, an electronic dictionary, an electronic key, a camcorder, and an electronic frame, just to name a few non-limiting possibilities.

According to some embodiments, the electronic device may include at least one of a navigation device and a vehicle infotainment device.

According to some embodiments, the electronic device may include at least one of a part of a furniture or building/structure, an electronic board, an electronic signature receiving device, and a projector. The electronic device according to various embodiments of the present disclosure may be a combination of one or more of the aforementioned devices. However, the electronic device according to various embodiments of the present disclosure is not limited to the aforementioned devices, and may be any device if it can access the wireless network, as would be understood to those of ordinary skill in the art.

Figure 2:
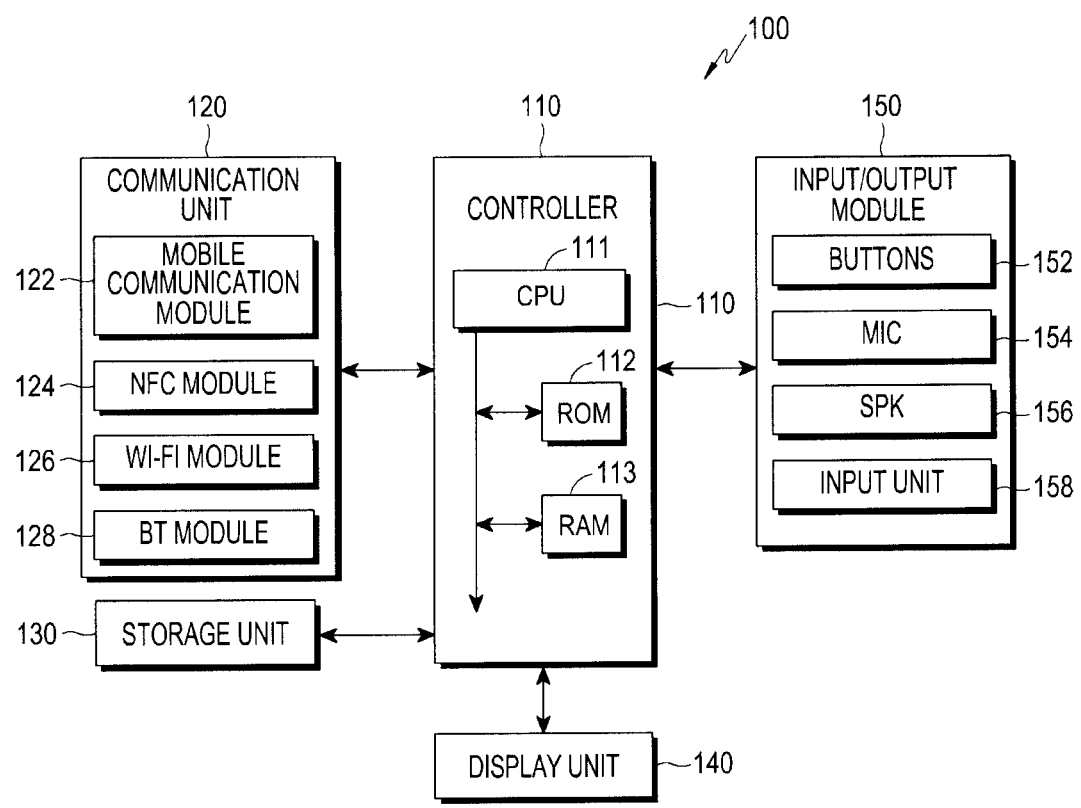
FIG. 2 is a block diagram of illustrating hardware of an electronic device according to an embodiment of the present disclosure.

FIG. 2 is a block diagram of an electronic device according to an embodiment of the present disclosure. Referring now to FIG. 2, an electronic device 100 may include a controller 110, a communication unit 120, a non-transitory storage unit 130, a display unit 140, and an input/output unit 150.

According to various embodiments of the present disclosure, the controller 110 comprises hardware that includes circuitry that may include integrated circuitry and may be embodied as a Central Processing Unit (CPU) 111. The controller 110 may include a Digital Signal Processor (DSP, not illustrated), also having circuitry configured for operation. The controller 110 includes a Read Only Memory (ROM) 112 in which a control program for controlling the electronic device 100 is stored, and further includes a Random Access Memory (RAM) 113 that memorizes a signal or data input from the outside of the electronic device 100 or is used as a memory region for a task performed in the electronic device 100. According to an embodiment of the present disclosure, the CPU 111 may include a single core, a dual core, a triple core, or a quad core processor, just to name some possible examples. The CPU 111, the ROM 112, and the RAM 113 may be interconnected through an internal bus. The controller 110 controls the communication unit 120, the storage unit 130, the display unit 140, and the input/output unit 150. For example, the controller 110 performs an overall control function of the electronic device 100 and controls a signal flow between components.

For example, if the electronic device 100 operates as the first electronic device 100a, the controller 110 may control the electronic device 100 to obtain from storage at least one or more of a user policy information, generate wireless network sharing information including effectiveness information or wireless network access information, and provide the generated wireless network sharing information.

If the electronic device 100 operates as the second electronic device 100b, the controller 110 may receive wireless network sharing information. For example, the controller 110 identifies wireless network access information or effectiveness information from the received wireless network sharing information. The controller 110 may control the electronic device 100 to access the communication network 300 through the wireless access device 200 according to the wireless network access information or effectiveness information and to be provided with a communication network service.

For example, the controller 110 may access the communication network 300 through the wireless access device 200 by using the wireless network access information, delete or store the wireless network access information according to the effectiveness information, and control access to the communication network 300 or release the access to the communication network according to the information about the period during which the electronic device 100 may access the communication network 300 through the wireless access device 200 or the information about the amount of data with which the electronic device 100 may be provided by accessing the communication network 300 through the wireless access device 200.

According to various embodiments of the present disclosure, the communication unit 120 also includes hardware circuitry such as a transmitter, receiver or transceiver and one or more associated antennas that enables the electronic device 100 to be connected with an external device that may include other electronic devices (not illustrated) such as a cellular phone (not illustrated), a smartphone (not illustrated), and a tablet PC, and the wireless access device 200.

For example, the communication unit 120 may include other hardware configured for operation including a mobile communication module 122, a Near Field Communication (NFC) module 124, a Wi-Fi module 126, and a Bluetooth (BT) module 128. The communication unit 120 may transmit and receive a wireless signal for a voice call, a video call, a Short Messaging Service (SMS) message, or a Multimedia Service (MMS) message with other electronic devices (not illustrated) such as a cellular phone (not illustrated), a smartphone (not illustrated), a tablet PC, and the like, just to name some non-limiting possibilities. The communication unit 120 may transmit and receive an NFC signal with other electronic devices through the NFC module 124. Under control of the controller 110, the communication unit 120 may also access the wireless access device 200 by using a wireless network communication module in a place where the wireless access device 200 is installed. For example, the wireless network communication module may be embodied as the Wi-Fi module 126 or the BT module 128. Both Wi-Fi and Bluetooth can be provided by the electronic device. For example, the Wi-Fi module 126 may access the Internet through the wireless access device 200 in a place where an AP is installed. The BT module 128 may access a BT communication network through the wireless access device 200.

According to various embodiments of the present disclosure, under control of the controller 110, the storage unit 130 may store a signal data or data input/output corresponding to operations of the controller 110, the communication unit 120, the display unit 140, and the input/output unit 150. The storage unit 130 stores a plurality of programs and a plurality of applications for control of the electronic device 100 or the controller 110 and various functions, for example, programs and data for executing a wireless network access function. The storage unit 130, which is a non-transitory storage unit, may store wireless network access information or effectiveness information according to an embodiment of the present disclosure, and may store a program, for example, an application for being provided with a wireless network access service mentioned in various embodiments of the present disclosure.

According to various embodiments of the present disclosure, the term "storage unit" may include the ROM 112 or the RAM 113 in the controller 110, or a memory card (not illustrated) mounted in the electronic device 100 (for example, a Secure Digital (SD) card or a memory stick). According to an embodiment of the present disclosure, the storage unit 120 may include a non-volatile memory, a volatile memory, a Hard Disk Drive (HDD), or a Solid State Drive (SSD). The storage unit 120 may be a medium that may be read by a machine (for example, a computer, a smartphone, or the like). In any event, the storage unit is a non-transitory storage medium, in accordance with structure associated with statutory subject matter, such as the machine-or-transformation test. The term "machine-readable medium" may be defined as a medium for providing data to the machine to allow the machine to execute a particular function. For example, the machine-readable medium may be a storage medium. The storage unit 120 may include non-volatile media or volatile media. Such a medium includes a tangible type of medium, so that commands delivered to the medium can be detected by a physical tool that reads the commands with the machine. The machine-readable medium may include, but is not limited to, at least one of a thumbnail drive, a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash EPROM.

According to various embodiments of the present disclosure, the display unit 140 (for example, a touch screen) may provide a Graphic User Interface (GUI) to a user when a wireless network access function is performed. For example, the display unit 140 may receive various gesture inputs such as at least one approach or touch through a user's body (for example, a finger including a thumb) or a touchable input unit 158 (for example, a pen). The display unit 140 may be implemented as, for example, a resistive type screen, a capacitive type screen, an infrared type screen, an acoustic wave type screen, or a combination thereof. According to an embodiment of the present disclosure, the display unit 140 may display screens corresponding to wireless network access and an Internet service providing screens after the wireless network access, under control of the controller 110.

According to various embodiments of the present disclosure, the input/output unit 150 may include buttons 152, a microphone (MIC) 154, a speaker (SPK) 156, and an input unit 158. For example, a cursor control such as a mouse, a track ball, a joy stick, or a cursor direction key may be provided to control communication with the controller 110 and movement of a cursor on the display unit 140. According to an embodiment, at least one button 152 may be provided in the electronic device 100, and various input signals corresponding to pressing of the user may be provided to the controller 110. The button may also be a virtual button shown on a touch screen of the input module, or may be a physical button. According to an embodiment, the microphone 154 is a transducer and may receive voice or sound corresponding to various sound sources and generate an electric signal, under control of the controller 110. According to an embodiment, the speaker 156 may output sound corresponding to various signals (for example, a wireless signal, a broadcasting signal, a digital audio file, a digital video file, and the like) received through wireless network access to the outside of the electronic device 100, under control of the controller 110. According to an embodiment, the input unit 158 may be a device or an object provided inserted into the electronic device 100 through a jack or port, for example, or may be provided separately from the electronic device 100. When the input unit 158 is provided inserted into the electronic device 100, the input input/output 158 is provided inserted in the electronic device 100, it may be drawn or removed. The input/output unit 158 may be an input means capable of inputting, for example, an approach or a touch on the display unit 140, such as a stylus pen (hereinafter, referred to as a 'pen') or may be a user's finger. A touch display that may be resistance, capacitive, infrared, surface acoustic wave, just to name some non-limiting possibilities.

According to an embodiment, an electronic device may include a communication unit configured to access a wireless network and a controller functionally connected with the communication unit, in which the controller obtains at least one of wireless network access information associated with a wireless network that is connectable with the electronic device and effectiveness information, and transmits via the communication unit the at least one information to an external device with respect to the electronic device such that the external device accesses the wireless network or releases the access to the wireless network based on the at least one information.

In accordance with an embodiment of the disclosure, the wireless network access information may include at least one of bearer information of the wireless network, an identifier of the wireless network, an encryption type of the wireless network, and a code of the wireless network.

The effectiveness information may include at least one of expiration information of the wireless network access information and information about an amount of data that may be provided through the access to the wireless network.

The effectiveness information may further include information about a wireless network access information storage possibility.

The controller may be configured to select a sharing scheme for the at least one information and transmit the at least one information to the external device by using the selected sharing scheme.

According to an embodiment of the present disclosure, an electronic device may include a communication unit configured to access a wireless network and a controller functionally connected with the communication unit, in which the controller receives at least one information of wireless network access information associated with a wireless network that connects with the electronic device and effectiveness information from an external device with respect to the electronic device and accesses the wireless network or releases the access to the wireless network based on the at least one information.

The controller may be configured to control storage or deletion of at least one of the wireless network access information and the effectiveness information.

Hereinafter, a description will be made of an operation of providing wireless network sharing information by the electronic device 100 and an operation of being provided with the wireless network sharing information to access a communication network by the electronic device 100.

Figure 3:
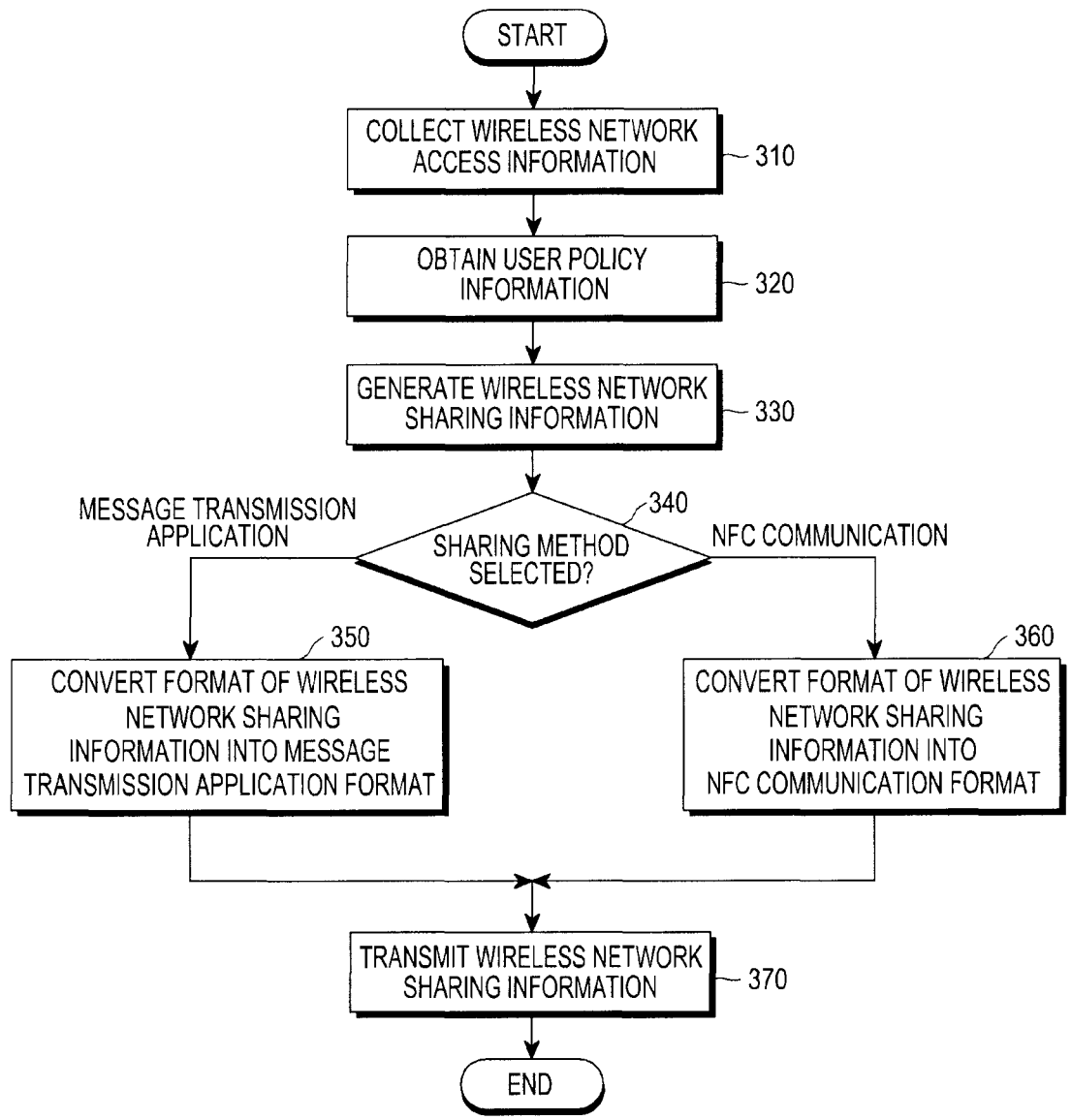
FIG. 3 is a flowchart illustrating a process of providing wireless network sharing information in an electronic device according to an embodiment of the present disclosure.

FIG. 3 is a flowchart illustrating an operational example of providing wireless network sharing information in the electronic device 100 according to an embodiment of the present disclosure.

Referring now to FIG. 3, at operation 310, the electronic device 100 collects wireless network access information as a request for sharing wireless network access information is generated. For example, the wireless network access information may include a bearer type of the wireless network, an identifier of the wireless network, an encryption type of the wireless network, a code of the wireless network, and the like. According to an embodiment of the present disclosure, the bearer type of the wireless network may include information about whether the wireless network is of a Wi-Fi type or of a BT type. According to an embodiment present disclosure, the identifier of the wireless network may include an identifier of the wireless access device 200 for wireless network access. For example, if the wireless access device 200 is an AP, the identifier of the wireless network may be an Extended Service Set Identity (ESS ID) of the AP. According to an embodiment of the present disclosure, the encryption type of the wireless network may be an encryption type for encrypting signals transmitted and received through the wireless network, and may include, for example, any information of a Wireless-Public Key Infrastructure (WPKI), Wi-Fi Protected Access (WPA), and Wi-Fi Protected Access2 (WPA2). The code of the wireless network may include password information as a code for accessing the wireless network. For example, the electronic device 100 may receive wireless network access information from the user. The electronic device 100 may collect previously stored wireless network access information. The electronic device 100 may also collect wireless network access information from another electronic device.

According to an embodiment of the present disclosure, at operation 320 the electronic device 100 may obtain user policy information. According to an embodiment of the present disclosure, the user policy information may be effectiveness information regarding the wireless network access information. The user policy information can be understood as the effectiveness information. The effectiveness information may include information about a wireless network access information storage possibility or information about a wireless network access condition.

For example, the information about the wireless network access information storage possibility may include an indication as to whether wireless network access information may be stored or not. If the wireless network access information cannot be stored, a "default" value may include FALSE.

According to an embodiment of the present disclosure, the wireless network access condition information may be lifespan information of the wireless network access information, and may include expiration information of the wireless network access information or the information about the amount of data provided through access to the wireless network. For example, the expiration information of the wireless network access information may include 0 or an N (natural number) value. If the expiration information of the wireless network access information is 0, it may mean that the wireless network access information is available without a limitation. If the expiration information of the wireless network access information is N, it may mean that the wireless network access information is available for a period N. According to an embodiment of the present disclosure, the information about the amount of data provided through access to the wireless network may include FREE or an N (natural number) value. If the information about the amount of data is FREE, it may mean that data may be provided without a limitation. If the information about the amount of data is N, it may mean that N-byte data may be provided. The user policy information may be obtained based on information input by the user of the electronic device 100 or may be obtained according to a preset value.

According to an embodiment of the present disclosure, the electronic device 100 generates wireless network sharing information at operation 330. For example, the electronic device 100 may generate wireless network sharing information including wireless network access information and effectiveness information.

According to an embodiment of the present disclosure, the electronic device 100 may select a sharing scheme at operation 340. For example, the electronic device 100 may select a way to share the wireless network sharing information. For example, the electronic device 100 may select whether to transmit the wireless network sharing information through a message transmission application or an NFC communication scheme. The sharing scheme may be selected by a user's input or in a preset manner. The message transmission application may be any application if the application may send a text message, such as a text message transmission application, a chat application, a Social Network Service (SNS) application, or the like.

For example, at operation 350 the electronic device 100 may change a format of the wireless network sharing information into a format of the message transmission application in response to the message transmission application being selected.

At operation 360, the electronic device 100 converts the format of the wireless network sharing information into an NFC communication format, in response to the NFC communication scheme being selected.

At operation 370, the electronic device 100 transmits the wireless network sharing information according to the selected sharing scheme.

Figure 4:
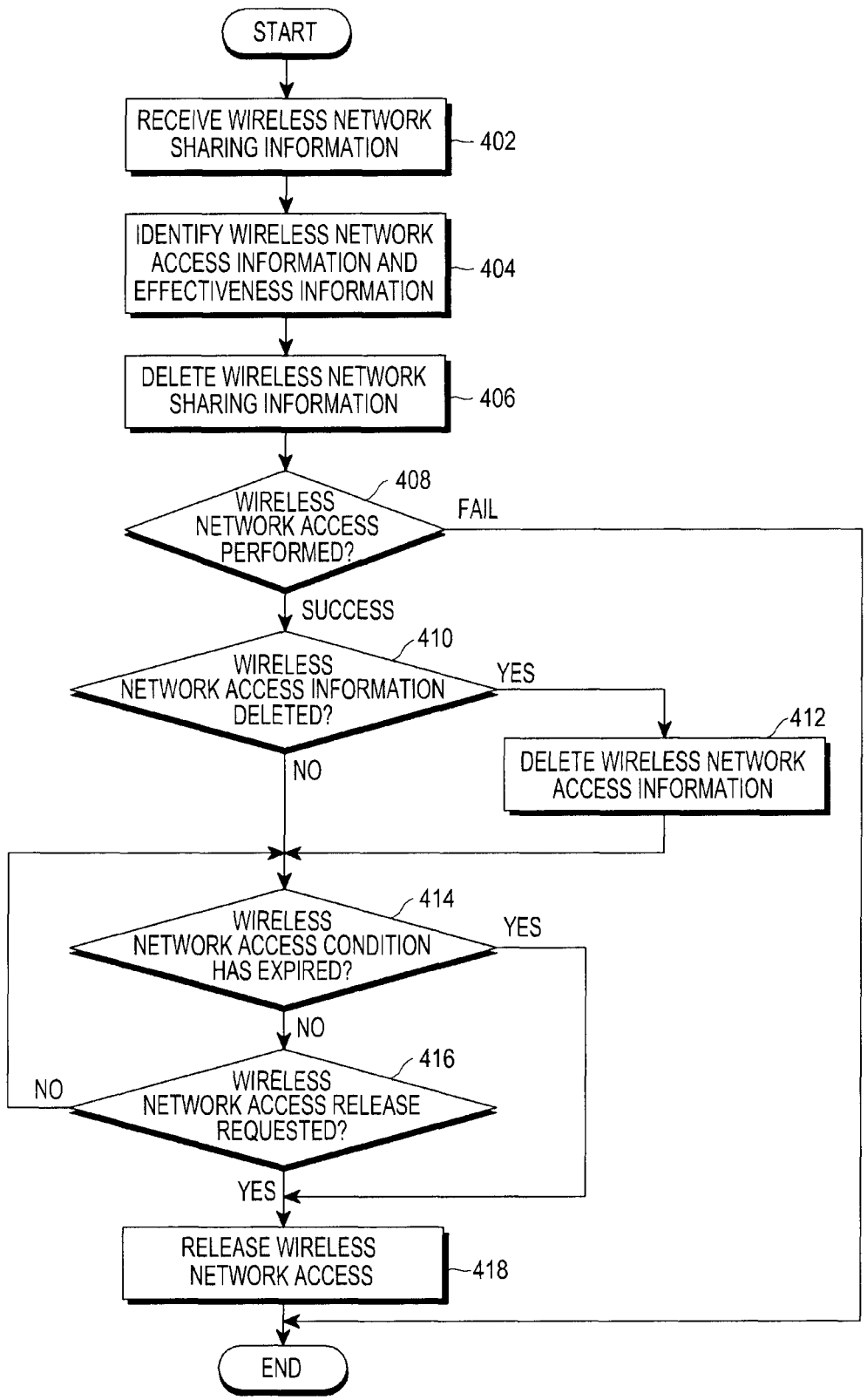
FIG. 4 is a flowchart illustrating a process of accessing a wireless network by being provided with wireless network sharing information in an electronic device according to an embodiment of the present disclosure.

FIG. 4 is a flowchart illustrating a process of accessing a wireless network by being provided with wireless network wireless network sharing information in an electronic device according to an embodiment of the present disclosure.

Referring now to FIG. 4, at operation 402 the electronic device 100 receives wireless network sharing information. For example, the electronic device 100 may receive wireless network sharing information from another electronic device in various ways, such as by using the message transmission application or the NFC communication scheme. The electronic device 100 may request wireless network sharing information and in response thereto receive the wireless network sharing information, or may receive wireless network sharing information transmitted at random.

At operation 404, the electronic device 100 identifies wireless network access information and effectiveness information from the received wireless network sharing information. For example, the electronic device 100 may recognize the wireless network access information and the effectiveness information in a text format from the wireless network sharing information.

At operation 406, after identifying the wireless network access information or the effectiveness information from the received wireless network sharing information, the electronic device 100 deletes the wireless network sharing information that is contained in a storage area.

At operation 408, the electronic device 100 accesses a wireless access device by using the wireless network access information. For example, if sending a wireless network access request to the wireless access device, the electronic device 100 may receive wireless network access information from the wireless access device in response to the wireless network access request.

At operation 410, the electronic device 100 may terminate the process if failing in accessing the wireless network. The electronic device 100 determines whether to delete the wireless network access information according to the user policy information, if the electronic device has succeeded in accessing the wireless network. For example, the electronic device 100 may determine whether to delete the wireless network access information by identifying the information about the wireless network access information storage possibility included in the effectiveness information. For example, at operation 412 the electronic device 100 deletes the wireless network access information if the information about the wireless network access information storage possibility has a value of "FALSE".

Unless the information about the wireless network access information storage possibility has the value of FALSE, the electronic device 100 proceeds to operation 414.

At operation 414, the electronic device 100 determines whether a wireless network access condition has expired. For example, the electronic device 100 may determine whether the wireless network access condition has expired based on wireless network access condition information included in the effectiveness information. For example, the electronic device 100 may determine that the wireless network access condition has expired if a threshold of the expiration information of the wireless network access information has been reached. If the amount of data with which the electronic device 100 has been provided by accessing the wireless network reaches a threshold value about the amount of data with which the electronic device 100 may be provided by accessing the wireless network, the electronic device 100 may determine that the wireless network access condition has expired.

At operation 418, the electronic device 100 releases the wireless network access in response to determining the wireless network access condition has expired.

At operation 418, the electronic device 100 determines whether a wireless network access release request is input from the user, if the wireless network access condition has not expired.

For example, the electronic device 100 may release the wireless network access at operation 418, in response to the wireless network access release request is input from the user when the wireless network access condition has not expired.

According to another embodiment of the present disclosure, if the wireless network access condition from the wireless access device has expired, the electronic device 100 may be controlled such that the wireless network access is released, or if the wireless network access condition from another electronic device providing the wireless network sharing information has expired, the electronic device 100 may be controlled such that the wireless network access is released.

According to an embodiment of the present disclosure, if the information about the wireless network access information storage possibility included in the effectiveness information indicates "impossible", the electronic device 100 may not be able to access the wireless network after the wireless network access is released.

Figure 5:
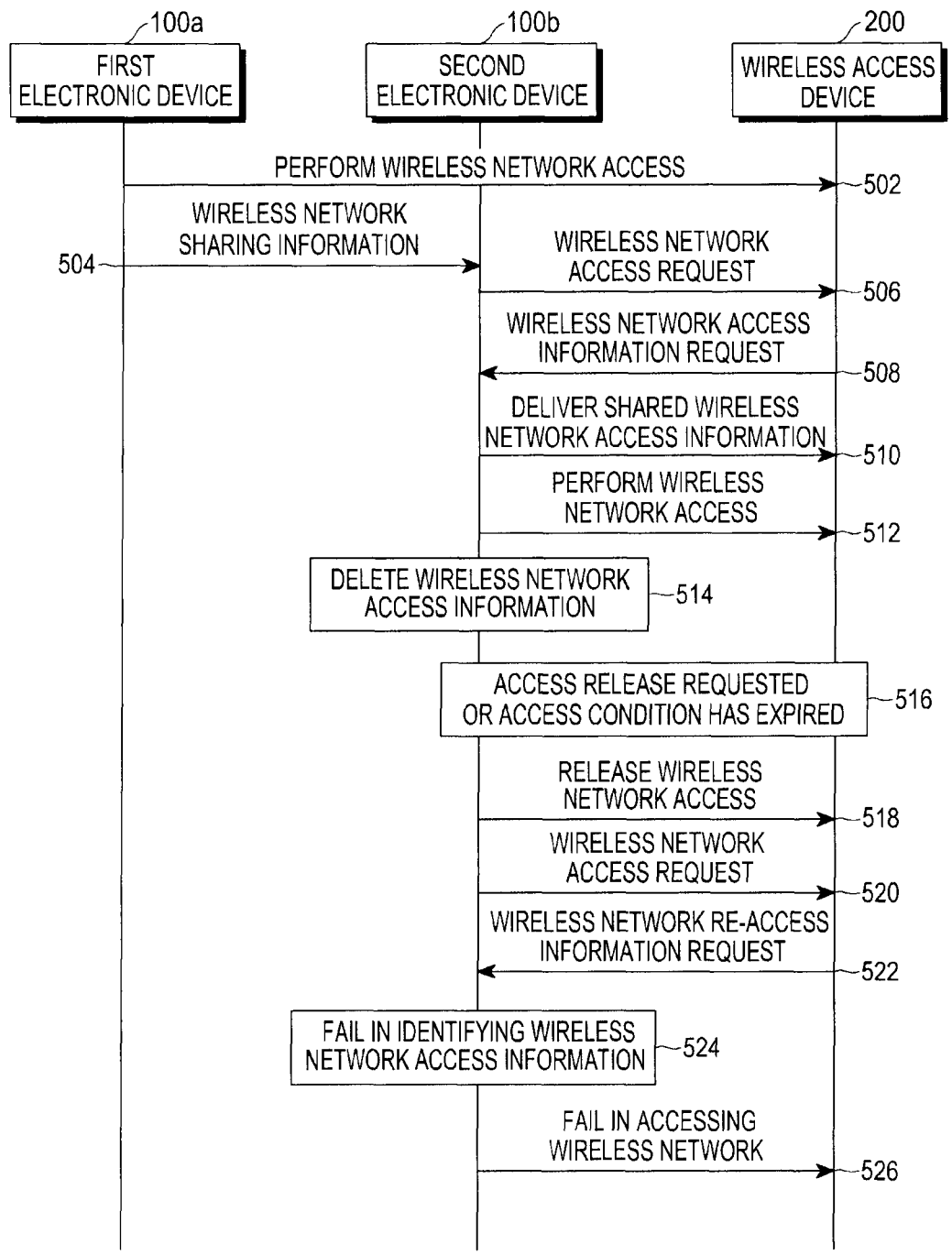
FIG. 5 is a flowchart illustrating a wireless network access operation when information about a wireless network access information storage possibility that is shared from a first electronic device indicates an "impossible" status in a second electronic device, according to an embodiment of the present disclosure.

FIG. 5 is a flowchart illustrating a wireless network access operation if information about a wireless network access information storage possibility shared from a first electronic device indicates "impossible" in a second electronic device, according to an embodiment of the present disclosure.

Referring to FIG. 5, a first electronic device 100a may be an electronic device having wireless network access information, which is capable of accessing a communication network 300 through a wireless access device 200.

For example, at operation 502 the first electronic device 100a accesses the wireless access device 200.

At operation 504, the first electronic device 100a provides wireless network sharing information to a second electronic device 100b. For example, the first electronic device 100a may obtain user policy information to generate wireless network sharing information including effectiveness information and wireless network access information. The first electronic device 100a may provide the wireless network sharing information to the second electronic device 100b. The wireless network access information may be a code such as a password for accessing the communication network 300 through the wireless access device 200. The effectiveness information may include information about a wireless network access information storage possibility, information about a period during which the second electronic device 100b may access the communication network 300 through the wireless access device 200, and information about the amount of data with which the second electronic device 100b may be provided by accessing the communication network 300 through the wireless access device 200. For example, the second electronic device 100b may receive the wireless network sharing information from the first electronic device 100b. The second electronic device 100b may identify wireless network access information and effectiveness information from the received wireless network sharing information.

At operation 506, after receiving the wireless network sharing information, the second electronic device 100b sends a wireless network access request to the wireless access device 200.

At operation 508, the wireless access device 200 sends a wireless network access information request to the second electronic device 100b in response to the wireless network access request.

At operation 510, the second electronic device 100b delivers the wireless network access information included in the wireless network sharing information to the wireless access device 200. As the wireless network access information is identified in the wireless access device 200, the second electronic device 100b performs wireless network access through the wireless access device 200 at operation 512.

For example, at operation 514, after performing the wireless network access, the second electronic device 100b deletes the wireless network access information, if the information about the wireless network access information storage possibility included in the effectiveness information has the value of FALSE.

At operation 516, the second electronic device 100b determines whether a wireless network access release request is input.

At operation 518, the wireless network access release request is input, the electronic device 100 sends a wireless network access release request to the wireless access device 200.

According to an embodiment of the present disclosure, if a wireless network access condition has not expired, the second electronic device 100b sends the wireless network access request (for example, one or more times) until the wireless network access condition expires.

For example, at operation 520 the second electronic device 100b sends a wireless network re-access request based on the wireless network access condition information included in the effectiveness information, if the expiration information of the wireless network access information is not reached, or if the amount of data with which the electronic device 100 has been provided by accessing the wireless network does not exceed the information about the amount of data with which the electronic device 100 may be provided by accessing the wireless network.

At operation 522, the wireless access device 200 sends the wireless network access information request to the second electronic device 100b in response to the wireless network re-access request.

At operation 524, the second electronic device 100b recognizes a failure in identifying the wireless network access information from a state where the wireless network access information is deleted.

At operation 526, the second electronic device 100b notifies a failure in accessing the wireless network according based on the failure in identifying the wireless network access information.

According to another embodiment of the present disclosure, the electronic device 100 may perform wireless network re-access in a state where the wireless network access condition has not expired after wireless network access is released, if the information about the wireless network access information storage possibility included in the effectiveness information indicates "possible".

Figure 6:
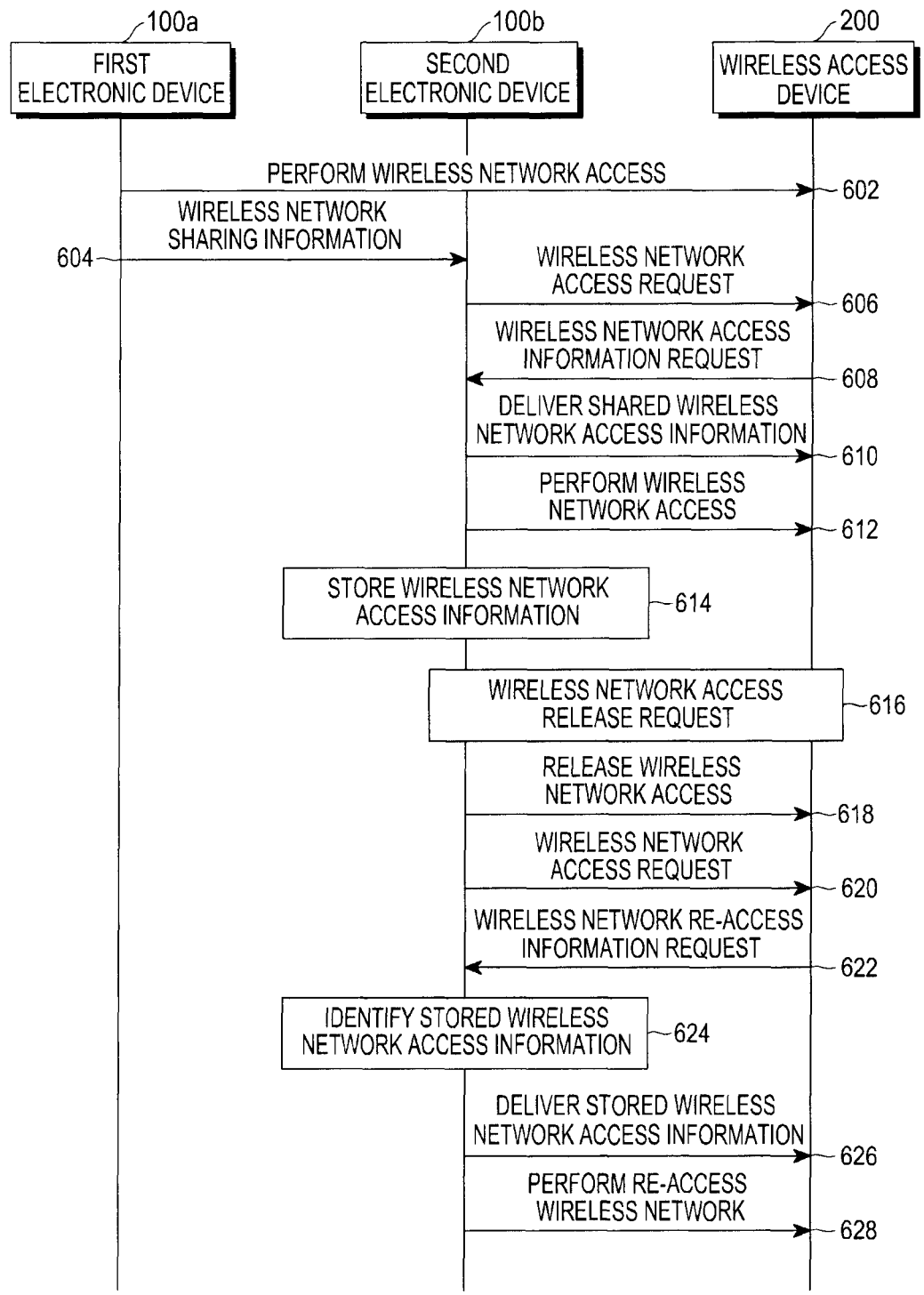
FIG. 6 is a flowchart illustrating a wireless network access operation if information about a wireless network access information storage possibility that is shared from a first electronic device indicates a "possible" status in a second electronic device, according to an embodiment of the present disclosure.

FIG. 6 is a flowchart illustrating a wireless network access operation if information about a wireless network access information storage possibility shared from a first electronic device indicates "possible" in a second electronic device, according to an embodiment of the present disclosure.

Referring now to FIG. 6, a first electronic device 100a may be an electronic device having wireless network access information, which is capable of accessing the communication network 300 through the wireless access device 200.

At operation 602, the first electronic device 100a accesses the wireless access device 200.

At operation 604, the first electronic device 100a provides wireless network sharing information to the second electronic device 100b. For example, the first electronic device 100a may obtain user policy information to generate wireless network sharing information including effectiveness information or wireless network access information. The first electronic device 100a provides the wireless network sharing information to the second electronic device 100a. The wireless network access information may be a code such as a password for accessing the communication network 300 through the wireless access device 200. According to an embodiment of the present disclosure, the effectiveness information may include information about a wireless network access information storage possibility, information about a period during which the second electronic device 100b may access the communication network 300 through the wireless access device 200, and information about the amount of data with which the second electronic device 100b may be provided by accessing the communication network 300 through the wireless access device 200. For example, the second electronic device 100b may receive the wireless network sharing information from the first electronic device 100a. The second electronic device 100b identifies the wireless network access information or the effectiveness information from the received wireless network sharing information.

At operation 606, after receiving the wireless network sharing information, the second electronic device 100b sends a wireless network access request to the wireless access device 200.

At operation 608, the wireless access device 200 sends a wireless network access information request to the second electronic device 100b in response to the wireless network access request.

At operation 610, the second electronic device 100b delivers the wireless network access information included in the wireless network sharing information to the wireless access device 200.

As the wireless network access information is identified in the wireless access device 200, at operation 612 the second electronic device 100b performs wireless network access through the wireless access device 200.

At operation 614, after accessing the wireless network, the second electronic device 100b stores the wireless network access information if the information about the wireless network access information storage possibility included in the effectiveness information has a value indicating "possible".

At operation 616, the second electronic device 100b determines whether a wireless network access release request is input.

If the wireless network access release request is input, then at operation 618 the second electronic device 100b sends a wireless network access release request to the wireless access device 200 and releases wireless network access.

At operation 620, the second electronic device 100 may send a wireless network access request (for example, one or more times) until the wireless network access condition expires. For example, the second electronic device 100b sends a wireless network re-access request based on the wireless network access condition information included in the effectiveness information, if the expiration information of the wireless network access information is not reached, or if the amount of data with which the electronic device 100 has been provided by accessing the wireless network does not exceed the information about the amount of data with which the electronic device 100 may be provided by accessing the wireless network.

At operation 622, the wireless access device 200 sends a wireless network access information request to the second electronic device 100b in response to the wireless network re-access request.

At operation 624, the second electronic device 100b identifies wireless network access information from the state where the wireless network access information is stored.

At operation 626, the second electronic device 100b delivers the stored wireless network access information as the wireless network access information is identified. As the wireless network access information is identified in the wireless access device 200, at operation 628 the second electronic device 100b performs wireless network re-access through the wireless access device 200.

According to an embodiment of the present disclosure, a wireless network access method in an electronic device may include obtaining at least one of wireless network access information associated with a wireless network that is connectable (i.e. communicatively compatible) with the electronic device and effectiveness information and transmitting the at least one information to an external device with respect to the electronic device such that the external device accesses the wireless network or releases the access to the wireless network based on the at least one information.

The wireless network access information may include at least one of bearer information of the wireless network, an identifier of the wireless network, an encryption type of the wireless network, and a code of the wireless network.

The effectiveness information may include at least one of expiration information of the wireless network access information and information about an amount of data that may be provided through the access to the wireless network.

The effectiveness information may further include information about a wireless network access information storage possibility, with indications that may include impossible or possible.

The transmitting of the at least one information to the external device may include selecting a sharing scheme for the at least one information and transmitting the at least one information to the external device by using the selected sharing scheme.

According to an embodiment of the present disclosure, a wireless network access method in an electronic device may include receiving at least one information of wireless network access information associated with a wireless network that is connectable (communicatively compatible) with the electronic device and effectiveness information from an external device with respect to the electronic device and accessing the wireless network or releasing the access to the wireless network based on the at least one information.

The method may further include storing or deleting at least one of the wireless network access information and the effectiveness information.

The above-described methods according to the present disclosure can be implemented in hardware circuitry, or loaded into hardware such as a processor controller, or is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller, or the programmable hardware contain circuitry that may be integrated, and can include memory components, e.g., RAM, ROM, Flash, etc. that may store or receive computer code that when accessed and executed by the computer, processor or hardware implement the processing methods described herein. In addition, it would be recognized that when a general purpose computer accesses code for implementing the processing shown herein, via the execution of the code transforms the general purpose computer into a special purpose computer for executing the processing shown herein. In addition, an artisan understands and appreciates that a "controller", "processor" or "microprocessor" constitute hardware in the appended claims and include integrated circuitry. Under the broadest reasonable interpretation, the appended claims constitute statutory subject matter in compliance with 35 U.S.C. § 101 and none of the elements constitute software per se. Nor is the disclosure and the append claims directed to a mere abstract idea.

The terms "unit" or "module" as may be used herein is to be understood as constituting or operating in conjunction with hardware such as a circuit, integrated circuit, processor or microprocessor configured for a certain desired functionality in accordance with statutory subject matter under 35 U.S.C. § 101, and such terms do not constitute software per se.

The embodiments of the present disclosure may be implemented in hardware, or a combination of hardware and machine executable instructions. The machine executable instructions may be recorded to a volatile or non-volatile storage device such as a ROM irrespective of deletable or re-recordable, to a memory such as a RAM, a memory chip, a memory device, or an integrated circuit, or to a storage medium that is optically or magnetically recordable and readable by a machine (e.g. a computer), such as a CD, a DVD, a magnetic disk, or a magnetic tape.

A non-transitory storage medium having a wireless network access program stored therein, in which the program executes in an electronic device, obtaining at least one of wireless network access information associated with a wireless network that is capable of communicating with the electronic device and effectiveness information and transmitting to an external device with respect to the electronic device the at least one of wireless information and effectiveness information such that the external device accesses the wireless network or releases the access to the wireless network based on the at least one of wireless network access information and effectiveness information.

A non-transitory storage medium having a wireless network access program stored therein, in which the program executes in an electronic device, receiving from an external device with respect to the electronic device at least one of wireless network access information associated with a wireless network that is capable of communicating with the electronic device and effectiveness information and accessing the wireless network or releasing the access to the wireless network based on the at least one of wireless network access information and effectiveness information. The wireless network access method according to various embodiments of the present disclosure may be implemented by a computer or an electronic device including a controller and a memory, and the memory is an example of a machine-readable storage medium suitable for storing a program or programs including instructions to implement the embodiments of the present disclosure. Thus, the embodiments of the present disclosure may include a program including a code for implementing the device or method of the claims of the present disclosure and a machine (computer)-readable storage medium having the program stored therein. The program may be electronically transferred through a medium such as a transmission signal delivered wired or wireless connection, and the present disclosure may properly include equivalents thereof.

In addition, the electronic device according to various embodiments of the present disclosure may receive and store the program from a program providing device wirelessly or wiredly connected to the electronic device. The program providing device may include a memory for storing instructions to perform the wireless network access method according to various embodiments of the present disclosure, a communication module for communicating with the electronic device wirelessly or by cable, and a controller for transmitting a corresponding program to the electronic device upon request or automatically As is apparent from the foregoing description, according to various embodiments of the present disclosure, a provider for providing wireless network access may provide wireless network access information to desired users while maintaining security to share the wireless network access information among the users.

Moreover, according to various embodiments of the present disclosure, by providing user policy information capable of controlling the use of a wireless network during access to the wireless network, a period of use of the wireless network by the user or the amount of data that may be used through the wireless network may be controlled.

Other effects that may be obtained or expected from the embodiments of the present disclosure are explicitly or implicitly disclosed in the detailed description of the embodiment of the present disclosure. For example, various effects expected from the embodiments of the present disclosure have been disclosed in the detailed description of the present disclosure.

While the present disclosure has been particularly shown and described with reference to exemplary embodiments thereof, various changes in form and detail may be made therein without departing from the spirit and scope of the present disclosure as defined by the following claims. Accordingly, the scope of the present disclosure will be defined by the appended claims and equivalents thereto.

What is claimed is:

1. A wireless network access method in an electronic device, the method comprising:
    storing, by the electronic device, a password associated with a WiFi network by receiving the password associated with the WiFi network from a first external device;
    connecting to the WiFi network using the received password;
    after disconnecting from the WiFi network, re-connecting to the WiFi network using the stored password; and
    transmitting the stored password to a second external device such that the second external device also connects to the WiFi network using the transmitted password and stores the transmitted password.

2. The method of claim 1, wherein the password is included in WiFi network access information, and the WiFi network access information is transmitted to the second external device; and
    wherein the method further comprises:
    transmitting, by the electronic device, at least one of expiration information of the WiFi network access information and data limit information that identifies a limit regarding an amount of data that is provided through the WiFi network to the second external device.

3. The method of claim 2, further comprising:
    transmitting, by the electronic device, storage possibility information associated with the WiFi network access information of the WiFi network, the storage possibility information indicating whether the transmitted WiFi network access information can be stored or must be deleted by the second external device, and
    wherein the storage possibility information indicates that the transmitted WiFi network access information must be deleted by the second external device so that the second external device can delete the transmitted WiFi network access information after connecting to an access point of the WiFi network.

4. The method of claim 3, further comprising:
    selecting a sharing scheme for at least one of the WiFi network access information, the expiration information, the data limit information, and the storage possibility information; and
    transmitting at least one of the WiFi network access information, the expiration information, the data limit information, and the storage possibility information to the second external device utilizing the selected sharing scheme.

5. An electronic device comprising:
    a memory;
    a communication module configured to access a WiFi network; and
    a processor functionally coupled with the communication module,
    wherein the processor is configured to:
        receive a password associated with the WiFi network using the communication module from a first external device;
        store the password associated with the WiFi network in the memory;
        connect to the WiFi network using the received password;
        after disconnecting from the WiFi network, re-connecting to the WiFi network using the stored passwords; and
        transmit the stored password to a second external device such that the second external device also connects to the WiFi network using the transmitted password and stores the transmitted password.

6. The electronic device of claim 5, wherein the password is included in WiFi network access information, and the WiFi network access information is transmitted to the second external device, and
    wherein the WiFi network access information further comprises at least one of:
        bearer information of the WiFi network;
        an identifier of the WiFi network;
        an encryption type of the WiFi network; or
        a code of the WiFi network.

7. The electronic device of claim 6, wherein the processor is further configured to:
    transmit at least one of expiration information of the WiFi network access information and data limit information that identifies a limit regarding an amount of data that is provided through the WiFi network to the second external device.

8. The electronic device of claim 7, wherein the processor is further configured to:
    transmit storage possibility information associated with the WiFi network access information of the WiFi network, the storage possibility information indicating whether the transmitted WiFi network access information can be stored or must be deleted by the second external device, and
    wherein the storage possibility information indicates that the transmitted WiFi network access information must be deleted by the second external device so that the second external device can delete the transmitted WiFi network access information after connecting to an access point of the WiFi network.

9. The electronic device of claim 8, wherein the processor is further configured to select a sharing scheme and control transmission of at least one of the WiFi network access information, the expiration information, the data limit information, and the storage possibility information to the second external device utilizing the selected sharing scheme.

10. A non-transitory storage medium having a wireless network access program stored therein, wherein the wireless network access program, when executed in an electronic device, causes the electronic device to:
receive a password associated with a WiFi network using a communication module from a first external device;
store the password associated with the WiFi network;
connect to the WiFi network using the received password,
after disconnecting from the WiFi network, re-connect to the WiFi network using the stored passwords; and
transmit the stored password to a second external device such that the second external device also connects to the WiFi network using the transmitted password and stores the transmitted password.

11. The non-transitory storage medium of claim 10, wherein the password is included in WiFi network access information, and the WiFi network access information is transmitted to the second external device, and
wherein the WiFi network access information further comprises at least one of:
bearer information of the WiFi network;
an identifier of the WiFi network;
an encryption type of the WiFi network; or
a code of the WiFi network.

12. The non-transitory storage medium of claim 11, wherein the wireless network access program further causes the electronic device to:
transmit at least one of expiration information of the WiFi network access information and data limit information that identifies a limit regarding an amount of data that is provided through the WiFi network to the second external device.

13. The non-transitory storage medium of claim 12, wherein the wireless network access program further causes the electronic device to:
transmit storage possibility information associated with the WiFi network access information of the WiFi network, the storage possibility information indicating whether the transmitted WiFi network access information can be stored or must be deleted by the second external device, and
wherein the storage possibility information indicates that the transmitted WiFi network access information must be deleted by the second external device so that the second external device can delete the transmitted WiFi network access information after connecting to an access point of the WiFi network.

14. The non-transitory storage medium of claim 13, wherein the wireless network access program further causes the electronic device to select a sharing scheme and control transmission of at least one of the WiFi network access information, the expiration information, the data limit information, and the storage possibility information to the second external device utilizing the selected sharing scheme.

\* \* \* \* \*